United States Patent [19]

Miura et al.

[11] 4,378,394
[45] Mar. 29, 1983

[54] REINFORCING MEMBER

[75] Inventors: Toshikatu Miura; Yukio Nagata; Yukio Okada, all of Tokyo, Japan

[73] Assignee: Nissan Motor Company, Limited, Yokohama, Japan

[21] Appl. No.: 356,455

[22] Filed: Mar. 9, 1982

[30] Foreign Application Priority Data

Mar. 16, 1981 [JP] Japan ................................. 56-37584

[51] Int. Cl.³ ........................... B32B 5/20; B32B 5/22
[52] U.S. Cl. .................................. 428/113; 296/188;
296/189; 428/158; 428/159; 428/182; 428/189;
428/212; 428/304.4; 428/308.4
[58] Field of Search ................. 428/31, 113, 158–160,
428/182, 212, 189, 304.4, 308.4, 318.4; 293/126,
128; 296/188, 189, 207, 146

[56] References Cited

FOREIGN PATENT DOCUMENTS 2061196  5/1981  United Kingdom .

Primary Examiner—Paul J. Thibodeau
Attorney, Agent, or Firm—Lane, Aitken & Kananen

[57] ABSTRACT

A reinforcing material, comprises a reinforcing resin sheet which is unhardened or semi-hardened to be flexible prior to its use; a high tensile-strength fiber for reinforcing the resin sheet in its longitudinal direction; a low tensile-strength fiber for reinforcing the resin sheet in its transverse direction; and an expandable material narrower than the resin sheet. The expandable material is flexible, at least before the reinforcing material is used. The expandable material is made of a material which can expand to form a bead-like projection before the resin sheet is hardened. The expandable material is fixed to the resin sheet. The resin sheet has its edge portions extending beyond the expandable material so that the underside surface of the edge portion constitutes a surface which can be affixed to the surface to be reinforced.

14 Claims, 10 Drawing Figures

FIG.1
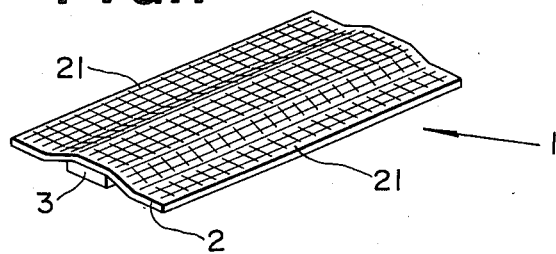
FIG.2(a) FIG.2(b)
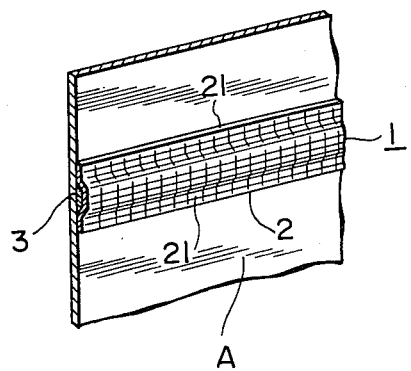 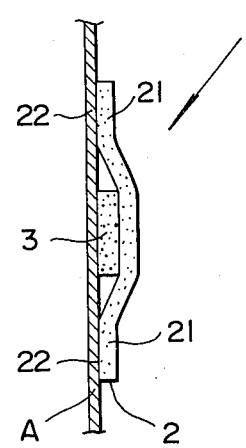
FIG.3(a) FIG.3(b)
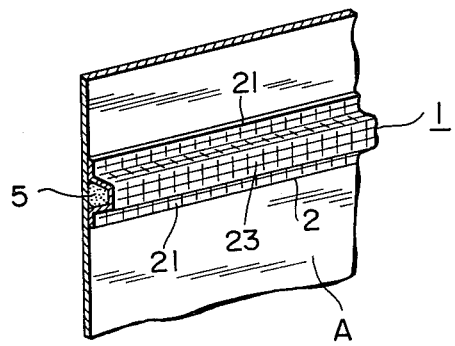 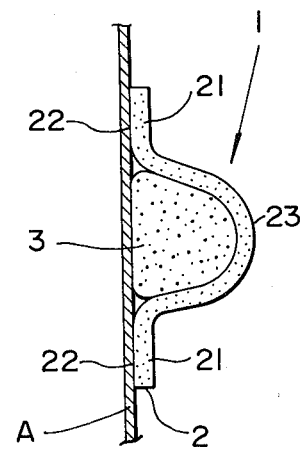

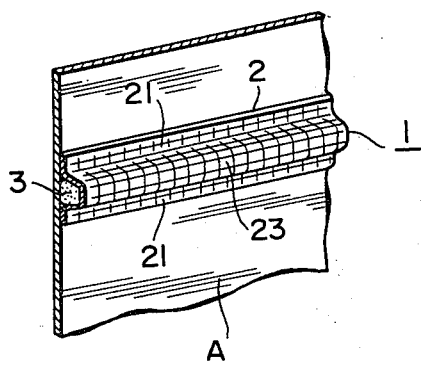
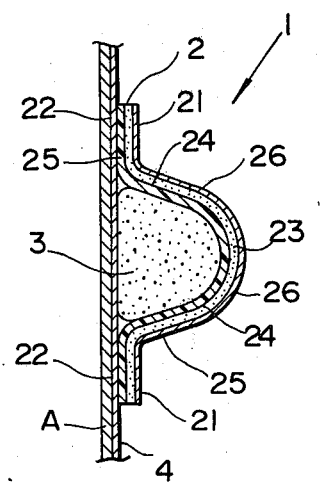
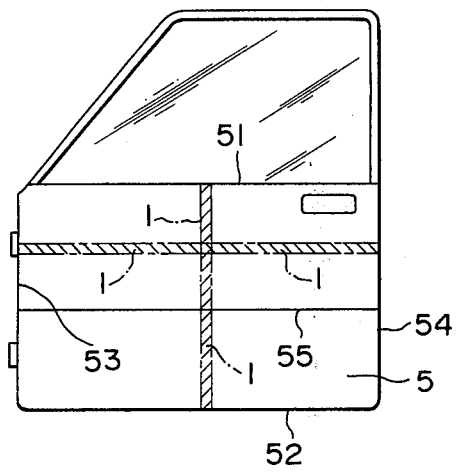
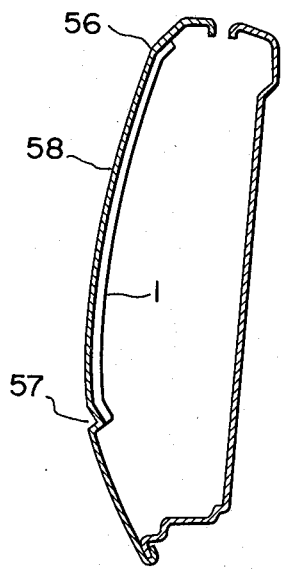

REINFORCING MEMBER

BACKGROUND OF THE INVENTION

This invention relates to a reinforcing member and a reinforced panel.

Weight reduction is desirable, for instance, in the automobile field, for resource-saving and energy-saving purposes. If weight reduction is achieved by decreasing the thickness of parts, or by reducing the number of components, strength is decreased. As a result, automotive body panels, particularly in doors, may have numerous weak points. The strength, and particularly tensile strength, of the outer panels may be significantly decreased. This results in poor door handling feelings for passengers.

Accordingly, it is necessary to develop a suitable reinforcing material. Reinforcement with heavy sheet metal is contradictory to the purpose of weight reduction. Thus, it has been proposed to reinforce the door outer panels or the like entirely or partly with a light resin sheet.

However, because prior art resin reinforcing have previously been just a thin resin sheet adhered onto an outer panel of a door, they have been nearly useless from the standpoint of increasing thickness and strength. If the thickness of the resin sheet is increased, then weight is increased. If packing is used between the resin sheet and the inside of the door outer panel to increase the thickness, then the resin sheet cannot be securely attached to the panel, and the structure is more complicated than necessary.

SUMMARY OF THE INVENTION

A reinforcing material includes a reinforcing resin sheet which is unhardened or semi-hardened to be flexible prior to its use, a high tensile-strength fiber for reinforcing the resin sheet along its longitudinal direction, a low tensile-strength fiber for reinforcing the resin sheet in its transverse direction, and a strip of expandable material narrower than the resin sheet. The expandable material is flexible at least before the reinforcing material is applied. The expandable material is made of a material which can form a bead-like projection before the resin sheet is hardened. The expandable material is fixed to the resin sheet. The resin sheet has its edge portions extending beyond the expandable material so that the underside surface of the edge portion constitutes a surface which can be bonded to the panel.

A panel such as an outer panel of an automobile door is reinforced by the reinforcing material.

BRIEF DESCRIPTION OF THE DRAWINGS

FIG. 1 is a perspective view showing a reinforcing material according to a first embodiment of this invention;

FIG. 2a shows the reinforcing material shown in FIG. 1 as attached to a panel before expansion and hardening;

FIG. 2b is a cross-sectional view of the reinforcing material shown in FIG. 2a;

FIG. 3a shows the reinforcing material corresponding to FIG. 2a, after expansion and hardening;

FIG. 3b is a cross-sectional view of the reinforcing material shown in FIG. 3a;

FIG. 4a is a perspective view of a reinforcing material according to a second embodiment of this invention;

FIG. 4b is a cross-sectional view of the reinforcing material shown in FIG. 4a;

FIG. 5 is a graph of the load-displacement relationships of some combinations of reinforcing fibers used in the reinforcing material according to this invention;

FIG. 6 is an elevation view of a vehicle door showing the positioning of the reinforcing material according to this invention.

DETAILED DESCRIPTION OF THE PREFERRED EMBODIMENTS

Figure 7:
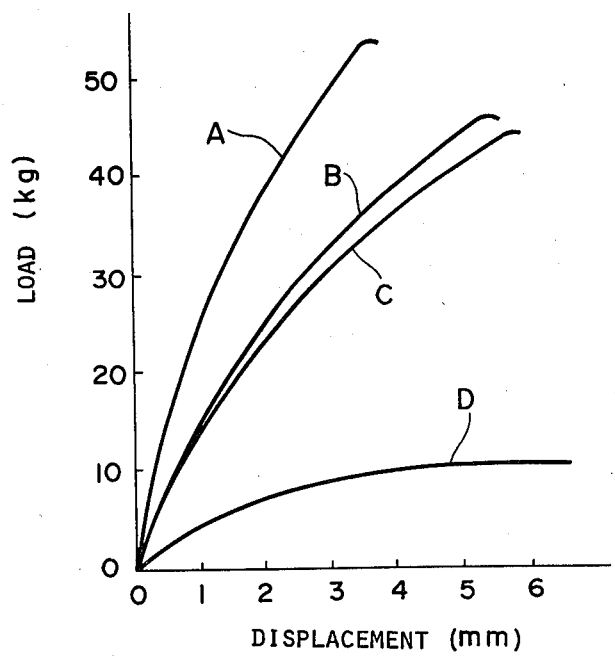
FIG. 7 is a cross-sectional view of an automobile door reinforced by a reinforcing material according to this invention.

FIGS. 1 to 3 show a first embodiment of this invention. FIGS. 1 and 2 show the case in which the reinforcing material has not been heat-treated. FIGS. 3a and 3b show the case in which the reinforcing material has been heat-treated to expand.

Referring to FIGS. 1 and 2, a reinforcing material 1 includes a reinforcing resin sheet 2 and an expandable material 3. The strip of expandable material 3 is narrower than the resin sheet 2 and is sandwiched between the panel A and the central portion of the resin sheet 2 so that the edges 21 of the resin sheet 2 remain free to be adhered to panel A at positions 22.

The reinforcing resin sheet 2 is preferably made of a thermosetting resin such as a thermosetting epoxy resin but is not strictly limited thereto. For instance, the resin sheet 2 may be melamine-, phenol- or urea type resins. The resin sheet 2 may be made of a resin which can be hardened at room temperature or a thermoplastic resin which has the desired strength at normal temperatures.

The reinforcing resin sheet 2 is in a semihardened or unhardened state when affixed to panel A in order to be suitably flexible. If it is attached to a vertical plate as shown in FIG. 2b, it preferably would be adhesive. Otherwise, the resin sheet 2 can be fixed to the panel by means of other adhesives.

The reinforcing resin sheet 2 includes high tensile-strength fibers, such as stainless steel fibers, carbon fibers or the like, in its longitudinal direction, mainly for the purpose of increasing bending strength, and with a low tensile-strength fiber, such as cotton, nylon, polyester or the like, in its transverse direction. Such a fiber or fibers can be added in any form, for example, by adhering them to the resin sheet 2 or embedding them in the resin sheet 2.

The expandable material 3 is preferably a foamable material such as a foamable polyethylene sheet, which is flexible prior to its expansion and expands when heated. Examples of such an expandable material are thermoplastic resins thermosetting resins, or foamable resins which are porous at room temperature.

The projection 23 might also be made of a previously expanded material, such as flexible corrugated cardboard or rope.

As shown in FIG. 2, the edges 21 of the reinforcing material 1 are bonded to the panel A so that it is fixed to the panel A. Since the reinforcing resin sheet 2 and the strip of expandable material 3 are flexible, they can be properly affixed to the panel A even if their combined shape is irregular. Then the panel A and the reinforcing material 1 are heated together. The resin sheet 2 becomes temporarily less viscous so that it will be become even more firmly bonded to the panel A. The expandable material 3 expands to stretch the resin sheet 2 and will expand to conform to the stresses in the resin sheet 2 during this heat treatment.

Because the resin sheet 2 is reinforced with the low tensile-strength fibers in its transverse direction, it can easily expand in accordance with the expandable material 3 without separating the resin sheet 2 from the panel A. When the reinforcing material 1 and the panel A are further heated for a predetermined period, the reinforcing resin sheet 2 is hardened. As a result, the reinforcing member 1 shown in FIG. 3 can be obtained, which conforms closely to the shape of panel A.

A previously-formed projection can be fixed to a reinforcing resin sheet 2 before the combined structure is attached to a panel.

FIG. 4 show a second embodiment of this invention. The reinforcing resin sheet 2 consists of two layers: an outer layer 24 of a reinforcing resin reinforced with or fibers and an inner layer 25 of a relatively soft resin which can be heat-treated to expand and harden to a desired degree. In addition, a film 26, such as a polyester film or the like, is fixed to the outer surface of the reinforcing sheet 2. The edges of the soft resin layer 25 are bonded to the attaching surfaces 22. In addition, a rust-proofing coating 4 is applied to the surface of the panel A. The expandable material 3 is the same as in the first embodiment.

The soft resin layer 25 is intended to minimize local strain or sagging of the panel A resulting from the resin expansion and contraction. Therefore, it need only be used at the bonding positions 22.

If the resiliency of the soft resin layer 25 is too low, the reinforcing effect of the reinforcing material 1 decreases. However, since the degree of local strain or partial sagging of the panel A is dependent on the thickness of the panel A, a required resiliency of the soft resin layer 25 can be predetermined. The soft resin layer 25 may be used in conjunction with a tough or hard resin layer which is not reinforced with fibers.

The film 26 is added to prevent the resin sheet 2 from adhering to other parts during handling when the resin sheet 2 has an adhesive character. Powder can be used in place of the film 26 for the same purpose.

The rust-proofing coating 4 may be a zinc-treated coating or painting.

Incidentally, the added materials or members in the second embodiment can also be used in the first embodiment.

FIG. 5 shows the results of experiments with respect to various combinations of low tensile-strength fibers and high tensile-strength fibers for reinforcing the resin sheet 2. A 10 mm height of bead-like projection is formed on a 0.7 mm thick steel panel as a test piece. The line A represents a load-replacement relationship in the case wherein the resin sheet is reinforced with stainless steel fibers in its longitudinal direction and fiber glass fibers in its transverse direction. The line B represents the analogous relationship in the case in which fiber glass fibers are used in the longitudinal direction of the resin sheet and nylon is used in the lateral direction thereof. In the case of line C, fiber glass fibers are used in both the longitudinal and transverse directions. In the case of line D, only the 0.7 mm thick steel panel is used.

As can be seen from FIG. 5, the bending strength is hardly affected by changing the fibers used in the transverse direction of the resin sheet. As compared with the naked steel panel, the reinforcing material of this invention remarkably improves the strength.

FIGS. 6 and 7 show a panel reinforced by a reinforcing material according to this invention.

A panel 5 serves as an outer panel of an automobile door. Since the panel 5 is relatively flat, if the thickness of the steel panel is decreased, the strength decreases so that the desired tensile strength of the outer panel may not be obtained. Thus, the outer panel can be easily deformed, and the door handling feelings are poor.

The panel 5 is supported at its upper edge 51, lower edge 52, front edge 53 and rear edge 54 by an inner panel or the like so that the strength of the panel 5 is high at those edge portions. It is also high at a character line 55 due to the thickness of this section. Therefore, it is necessary to reinforce the center of the upper portion of the panel and portions adjacent thereto. If reinforcing material were attached only along the center of the upper portin of the panel, the desired strength would not be obtained because there would still be no means for securing the upper portion to the rest of the panel.

In the example of FIG. 6, the reinforcing material 1 is disposed between the upper edge 51 and the character line 55 which are relatively strong whereby the relatively weak upper portion is reinforced by the reinforcing material anchored by the highly rigid edge portion and character line. The reinforcing material further extends to the lower edge 52 to improve the strength of the intermediately rigid portion between the character line and the lower edge. Also, the reinforcing material 1 is disposed between the front edge 53 and the rear edge 54 along the horizontal axis of the upper portion to increase the strength of the weak upper portion of the panel. Thus, the panel is thoroughly strengthened.

In the embodiment of FIG. 7, the reinforcing material 1 is placed between the upper character line 56 and the lower character line 57 to increase the strength of the intermediate flat portion 58.

If the reinforcing material 1 is arranged as in the above-stated examples, the load exerted on the less-rigid portions is transferred to the more-rigid portions through the reinforcing material 1. Thus, the strength is remarkably increased.

Incidentally, the reinforcing material can be arranged in any form to the panel to be reinforced. For instance, it can be arranged in a linear, curved or cross pattern.

According to this invention, since a reinforcing material is flexible prior to its use, it will conform closely to the shape of a panel so that the reinforcing material can be securely bonded to the panel. No additional shaping is necessary prior to its use. Before it hardens, a bead-like projection of desired height is formed to increase the rigidity of the reinforced panel. In addition, suitable fibers are selectively used to reinforce the reinforcing material in the longitudinal and transverse directions thereof. Therefore, it can be light and can be manufactured at low cost.

The heating of the reinforcing material can be done in a coating-drying furnace for an automotive vehicle body.

Also, rust-proofing and avoidance of local strain or partial sagging can be additionally achieved to further improve the strength of the panel.

When such a reinforcing material is employed on a panel, a relatively small volume of reinforcing material can reinforce the panel to a great extent so that the panel can be sufficiently reinforced and still be light.

What is claimed is:

1. A reinforcing material, comprising:

a reinforcing resin sheet which is unhardened or semi-hardened so as to be flexible prior to its use, and which can be hardened to be rigid;
high tensile-strength fibers reinforcing the resin sheet in its longitudinal direction;
low tensile-strength fibers reinforcing the resin sheet in its transverse direction;
an expandable material, in a strip narrower than the resin sheet;
the expandable material being flexible at least before the reinforcing material is used;
the expandable material being made of a material which can expand before the resin sheet hardens;
the expandable material being fixed to the resin sheet;
the resin sheet having its edge portions extending beyond the expandable material so that the edge portions constitute surfaces which can be affixed to the surface to be reinforced.

2. The reinforcing material of claim 1, wherein the resin sheet is made of a thermosetting resin material.

3. The reinforcing material of claim 1, wherein the resin sheet is made of a resin which can be hardened at a room temperature.

4. The reinforcing material of claim 1, wherein the resin sheet is made of a thermoplastic resin which has a predetermined strength at normal temperatures.

5. The reinforcing material of claim 1, wherein the fibers are embedded in the resin sheet.

6. The reinforcing material of claim 1, wherein the fibers are bonded onto the resin sheet.

7. The reinforcing material of claim 1, wherein the expandable material is a foamable material which is flexible prior to its foaming and foamed by heating.

8. The reinforcing material of claim 1, wherein the expandable material is replaced by corrugated cardboard.

9. The reinforcing material of claim 1, wherein the expandable material is replaced by a rope.

10. The reinforcing material of claim 1, wherein the resin sheet includes an outer layer of a resin reinforced with fibers and an inner layer of soft resin which can expand and harden to a predetermined degree.

11. The reinforcing material of claim 10, wherein a film is bonded to the outer surface of the outer layer.

12. A panel reinforced by the reinforcing material as defined in claim 1.

13. The panel of claim 12, wherein the reinforcing material is placed between two high-rigidity portions of the panel for reinforcing the intermediate, low-rigidity portion thereof.

14. The panel of claim 12, wherein the panel is an outer panel of an automobile door.

* * * * *

UNITED STATES PATENT AND TRADEMARK OFFICE
CERTIFICATE OF CORRECTION

PATENT NO. : 4,378,394
DATED : March 29, 1983
INVENTOR(S) : Toshikatu Miura et al.

It is certified that error appears in the above-identified patent and that said Letters Patent is hereby corrected as shown below:

Insert the following paragraph after line 11 and before "DETAILED DESCRIPTION OF THE PREFERRED EMBODIMENTS";

--Fig. 7 is a graph of the load-displacement relationships of some combinations of reinforcing fibers used in the reinforcing material according to this invention.--;

Column 3, line 15, "show" should read -- shows--;
Column 3, line 17, delete "or";
Column 3, line 49, "5" should read -- 7 --;
Column 4, line 1, "6 and 7" should read -- 5 and 6 --;
Column 4, line 20, "6" should read -- 5 --;
Column 4, line 33, "7" should read -- 6 --;

In the Abstract, line 1, delete the comma(,) after "material".

UNITED STATES PATENT AND TRADEMARK OFFICE
CERTIFICATE OF CORRECTION

PATENT NO. : 4,378,394

DATED : March 29, 1983

INVENTOR(S) : Toshikatu Miura et al.

It is certified that error appears in the above-identified patent and that said Letters Patent is hereby corrected as shown below:

Column 1, line 23, insert --members-- after "reinforcing";

Column 2, delete lines 3-5 (referring to Figure 5) in their entirety;

Column 2, line 6, "6" should read -- 5 --;

Column 2, line 8, delete "and";

Column 2, line 9, "7" should read -- 6 --;

Column 2, line 11, "invention." should read -- invention; and --;

Signed and Sealed this

Thirteenth Day of September 1983

[SEAL]

Attest:

Attesting Officer

GERALD J. MOSSINGHOFF

Commissioner of Patents and Trademarks